United States Patent
Marin et al.

(10) Patent No.: US 7,284,362 B2
(45) Date of Patent: Oct. 23, 2007

(54) INTEGRATED AIR SEPARATION AND OXYGEN FIRED POWER GENERATION SYSTEM

(75) Inventors: Ovidiu Marin, Lisle, IL (US); Scott Macadam, Chicago, IL (US); Frederic Fillet, Clamart (FR); Pietro Di Zanno, Rueil Malmaison (FR)

(73) Assignee: L'Air Liquide, Société Anonyme À Directoire et Conseil de Surveillance pour l'Étude Et l'Exploitation des Procedes Georges Claude, Paris (FR)

( * ) Notice: Subject to any disclaimer, the term of this patent is extended or adjusted under 35 U.S.C. 154(b) by 539 days.

(21) Appl. No.: 10/351,586

(22) Filed: Jan. 27, 2003

(65) Prior Publication Data
US 2004/0016237 A1    Jan. 29, 2004

Related U.S. Application Data

(60) Provisional application No. 60/356,105, filed on Feb. 11, 2002.

(51) Int. Cl.
*F02C 6/00*    (2006.01)

(52) U.S. Cl. .................... 60/39.182; 60/39.5

(58) Field of Classification Search ............ 60/774, 60/726, 39.15, 39.5, 39.17, 39.181, 39.182 60/39.183, 39.52, 39.55
See application file for complete search history.

(56) References Cited

U.S. PATENT DOCUMENTS

| | | | | |
|---|---|---|---|---|
| 3,868,817 A | * | 3/1975 | Marion et al. ............ | 60/781 |
| 4,434,613 A | * | 3/1984 | Stahl ....................... | 60/784 |
| 4,785,621 A | * | 11/1988 | Alderson et al. .......... | 60/39.12 |
| 4,785,622 A | | 11/1988 | Plumley et al. | |
| 5,231,837 A | * | 8/1993 | Ha ........................... | 62/646 |
| 5,388,395 A | * | 2/1995 | Scharpf et al. ............ | 60/781 |
| 5,555,723 A | * | 9/1996 | Dowdy ..................... | 60/39.182 |
| 5,609,041 A | * | 3/1997 | Rathbone et al. .......... | 62/646 |
| 5,666,823 A | * | 9/1997 | Smith et al. ............... | 62/646 |

(Continued)

FOREIGN PATENT DOCUMENTS

WO    WO 01/92703 A1 * 12/2001

OTHER PUBLICATIONS

O. Bolland, et al.; New Concepts for Natural Gas Fired Power Plants Which Simplify the Recovery of Carbon Dioxide; Energy Convers. Mgmt; vol. 33; No. 5-8; pp. 467-475; Printed in Great Britain; 1992.

(Continued)

*Primary Examiner*—William H. Rodriguez
(74) *Attorney, Agent, or Firm*—Elwood L. Haynes; Christopher J. Cronin

(57) ABSTRACT

An integrated air separation and oxygen fired power generation system includes an air separation unit and a gas turbine including an air compressor to provide compressed air for the air separation unit. The system further includes a gas turbine expander and at least one additional turbine to drive the air compressor, as well as at least one combustion unit to provide drive gas for expander and additional turbine(s). A portion of oxygen produced by the air separation unit is delivered to the combustor(s) to facilitate production of drive gas for use by the expander and additional turbine(s). Turbine inlet temperatures are controlled by recycling water or steam to the combustor(s).

23 Claims, 3 Drawing Sheets

U.S. PATENT DOCUMENTS

| | | | |
|---|---|---|---|
| 5,666,825 A * | 9/1997 | Darredeau et al. | 62/656 |
| 5,724,805 A * | 3/1998 | Golomb et al. | 60/783 |
| 5,901,547 A * | 5/1999 | Smith et al. | 60/773 |
| 6,148,602 A * | 11/2000 | Demetri | 60/775 |
| 6,202,442 B1 | 3/2001 | Brugerolle | |
| 6,276,171 B1 | 8/2001 | Brugerolle | |
| 6,282,901 B1 | 9/2001 | Marin et al. | |
| 6,550,234 B2 * | 4/2003 | Guillard | 60/39.6 |
| 6,612,113 B2 * | 9/2003 | Guillard | 60/783 |
| 6,718,794 B2 * | 4/2004 | Brugerolle et al. | 62/648 |
| 6,877,319 B2 * | 4/2005 | Linder et al. | 60/772 |
| 2003/0131582 A1 * | 7/2003 | Anderson et al. | 60/39.55 |
| 2005/0126156 A1 * | 6/2005 | Anderson et al. | 60/39.12 |

OTHER PUBLICATIONS

E.I. Yantovskii; The Thermodynamics of Fuel-Fired Power Plants Without Exhaust Gases; Institute for Energy Research; pp. 571-595; U.S.S.R. Academy of Sciences; Moscow, U.S.S.R.; 1991.

* cited by examiner

INTEGRATED AIR SEPARATION AND OXYGEN FIRED POWER GENERATION SYSTEM

CROSS REFERENCE TO RELATED APPLICATION

This application claims priority from U.S. Provisional Patent Application Ser. No. 60/356,105, entitled "Integrated Air Separation Unit and Oxygen-Fired Power Generation System" and filed Feb. 11, 2002. The disclosure of the above-mentioned provisional application is incorporated herein by reference in its entirety.

BACKGROUND OF THE INVENTION

1. Technical Field

The present invention pertains to air separation units combined with oxygen fired power generation systems.

2. Discussion of the Related Art

Cryogenic air separation is typically preferred in the industry for yielding large volumes of oxygen and nitrogen, which may then be used in variety of different power generation systems. However, a drawback to a cryogenic air separation system is that power costs associated with system operation can run as high as 50% of the overall operational costs, where most of the power is consumed by the main air compressor disposed upstream of the air separation unit. Accordingly, the power costs associated with the main air compressor have a strong influence on the total production cost of the products emerging from the air separation unit. Optimization of the turbine configuration that drives the main air compressor is desirable in order to reduce power costs associated with system operation.

A variety of different systems are known in the art that integrate air separation units with power generation processes in one form or another. For example, U.S. Pat. No. 6,282,901 to Marin et al. describes an integrated air separation process that produces an oxygen enriched gas stream and a nitrogen enriched gas stream. The nitrogen enriched gas stream is heated in a first heat exchanger associated with a first boiler and then used to generate power. The oxygen enriched gas stream is introduced with fuel to a combustor associated with the first boiler to produce a flue gas, and at least a portion of the flue gas exiting the boiler is used to generate power.

U.S. Pat. Nos. 6,202,442 and 6,276,171 to Brugerolle describe integrated power generation systems where part of the air emerging from a gas turbine compressor is sent to an air separation unit and another part is sent to a combustor of the gas turbine. A nitrogen gas stream emerging from the air separation unit is mixed with the discharge of the gas turbine combustor and then sent to the gas turbine expander. The Brugerolle systems generate power and also produce an oxygen-enriched fluid.

U.S. Pat. No. 4,785,622 to Plumley et al. describes an integrated coal gasification plant and combined cycle system employing a supply of compressed air bled off from an air compressor portion of a gas turbine to supply the compressed-air needs of an oxygen plant associated with the coal gasification plant. The high temperature exhaust from the turbine section of the gas turbine is utilized to generate steam, and the generated steam is delivered to a steam turbine to generate a mechanical output in addition to the output generated by the gas turbine. In order to compensate for the removal of compressed air fed to the oxygen plant, the spent steam from the steam turbine is added to the compressed air and fuel fed to the combustor portion of the gas turbine. The system of Plumley et al. eliminates the need for a separate compressor to provide compressed air to the oxygen plant.

U.S. Pat. No. 6,148,602 to Demetri describes a solid-fueled power generation system with carbon dioxide sequestration including an air compressor and an oxygen compressor driven by a single gas turbine. The air compressor delivers compressed air to an air separator, with substantially pure oxygen emerging from the air separator being further compressed by the oxygen compressor and then divided into two streams. The first stream is delivered to a gasifier and the second stream to a combustor for the gas turbine. The first stream is combined with a solid fuel in the gasifier and converted into a combustible gas that is sent to the combustor. Water is also injected into the combustor, and an exhaust stream of carbon dioxide and steam emerging from the combustor is passed into the gas turbine for driving the turbine and providing power.

A system described by Bolland et al. (*Energy Conversion & Mgmt*, Volume 33, No. 5-8, 1992, pages 467-475) includes a combustor that receives oxygen from an air separation plant and reacts the oxygen with a fuel gas, followed by delivering the combustion products to a turbine. A water stream is passed through a heat exchanger to cool compressed air discharged from an air compressor before the compressed air is directed to the air separation plant, and the water or steam discharge from the heat exchanger is then delivered to the combustor to cool the combustor products down to a permissible turbine inlet temperature.

A GOOSTWEG power plant, which is described by Yantovskii (*World Clean Energy Conference*, Geneva, Switzerland, November 1991, pages 571-595), includes a first combustion chamber that receives oxygen from an air splitting machine, a hydrocarbon fuel and water to produce a drive gas of carbon dioxide and steam that is delivered to a high pressure turbine. The discharge from the high pressure turbine is reheated in a second combustion chamber and delivered to a medium pressure turbine, followed by a reheating in a third combustion chamber and delivery to a low pressure turbine. Carbon dioxide is separated from water in a degasser, and the separated water is then heated and recycled back to the first combustion chamber.

While each of the systems described above provides certain efficiencies and advantages, there still exists a need to provide an integrated air separation and power generation system with an optimized configuration to reduce power requirements and thus operating costs associated with operation of the air separation unit.

OBJECTS AND SUMMARY OF THE INVENTION

Accordingly, it is an object of the present invention to provide an integrated air separation and power generation system that that reduces power requirements during system operation.

It is another object of the present invention to configure the power generation system for the air separation unit such that power requirements for the air separation unit are lower in comparison to utilizing a conventional on-site power plant to operate the air separation unit.

It is a further object of the present invention to provide an integrated air separation and power generation system that efficiently integrates heat during system operation and optimizes turbine configuration for providing power to the main air compressor of the air separation unit.

It is still another object of the present invention to provide an integrated air separation and power generation system that yield a zero emissions process.

The aforesaid objects are achieved individually and/or in combination, and it is not intended that the present invention be construed as requiring two or more of the objects to be combined unless expressly required by the claims attached hereto.

According to the present invention, an integrated air separation and oxygen fired power generation system includes an air separation unit and a gas turbine including an air compressor coupled to a gas turbine expander and a combustion unit that provides drive gas to the expander. The air compressor delivers compressed air to the air separation unit. The system further includes at least one additional turbine coupled to the air compressor. The air compressor is driven by the expander and one or more additional turbines when drive gas is fed through each of the expander and one or more additional turbines. The air separation unit produces at least two product streams including a stream of primarily oxygen, with a portion of the oxygen stream produced by the air separation unit being fed to the combustion unit. Additional combustion units may be provided to facilitate generation of drive gas at selected temperatures and pressures to the expander and one or more additional turbines. Turbine temperature conditions are preferably controlled by recycling water or steam from the drive gas to at least one combustion unit in the system.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

An integrated air separation and power generation system includes an air separation unit (ASU) that receives compressed air from an air compressor of a gas turbine. The gas turbine further includes a gas turbine expander coupled (e.g., via a shaft) to the air compressor to facilitate the direct transfer of mechanical energy from the expander to the compressor during system operation. One or more additional turbines are also integrated into the system in an optimized manner to further deliver power to the air compressor so as to provide air to the ASU in an efficient and cost-effective manner as described below. An exemplary type of ASU for use in the system is a cryogenic system. However, the ASU may include any one or more other systems suitable for separating two or more combined gas and/or liquid components including, without limitation, membrane systems and adsorption systems.

The power generation system preferably includes one or more combustion units to provide supply gas to the gas turbine expander and one or more additional turbines. A combustion unit suitable for use in the present invention facilitates the combustion of oxygen with a hydrocarbon fuel to elevate the temperature of a drive gas (e.g., carbon dioxide and/or steam) utilized for driving a turbine. Exemplary types of combustion units that may be employed in the present invention include, without limitation, combustors, reheaters and boilers. When employing, e.g., a combustor and a reheater, the combustion products (e.g., steam and carbon dioxide) are preferably included as at least part of the drive gas for the turbine. When employing, e.g., a boiler, the combustion products are utilized to heat the drive gas (e.g., steam) to the desired temperature and pressure in the boiler prior to delivery to the turbine.

Figure 1:
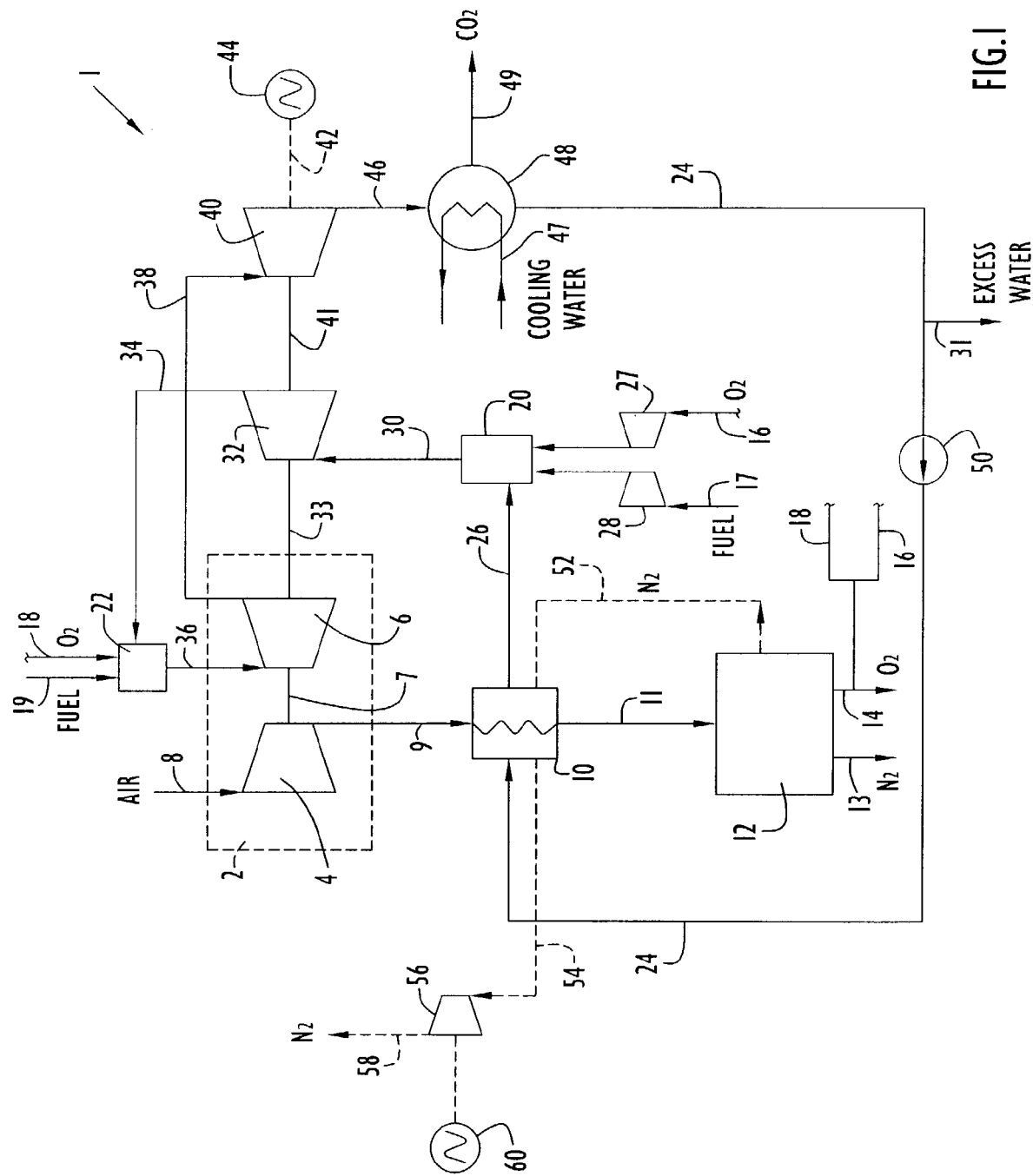
FIG. 1 is a flow diagram of an integrated air separation unit and power generation system in accordance with the present invention.

In the exemplary system of FIG. 1, two steam turbines are coupled along with a gas turbine expander to an air compressor. Two combustion units, namely, a high pressure combustor and a reheater, are also provided to deliver the drive gas at the selected temperature and pressure to the gas turbine expander and steam turbines. Referring to FIG. 1, system 1 includes a gas turbine unit 2 and a cryogenic ASU 12 that receives compressed air from the gas turbine unit. Gas turbine unit 2 includes an air compressor 4 and a gas turbine expander 6 connected to the compressor via a shaft 7. Shaft 7 is driven by gas delivered to the gas turbine expander as described below. The air compressor receives an air stream 8 and compresses the air stream to a suitable pressure prior to delivery to ASU 12. Preferably, the compressed air stream discharged from the air compressor has an absolute pressure in the range of about 5-25 bar. Located downstream from air compressor 4 is a heat exchanger 10 that receives a compressed air stream 9 discharged from the air compressor and cools the compressed air stream to a desired temperature with a current of water flow delivered by a water stream 24 to a separate inlet of the heat exchanger. Preferably, the heat exchanger cools the compressed air stream to a temperature within a range of about 20-50° C. The air stream outlet of heat exchanger 10 is coupled to ASU 12 to deliver a cooled and compressed air stream 11 into the ASU.

The ASU produces separate product streams 13, 14 of primarily nitrogen and oxygen. Optionally, additional streams of other gas products (e.g., argon, helium, etc.) may also be produced. The gas product streams may be delivered to other facilities or systems for storage or utilization of the gas products in a desired manner. A selected portion of oxygen is separated from the main oxygen product stream 14 and is fed to combustion units for producing a drive gas to drive the expander and turbines. Specifically, a first oxygen stream 16 is split from the main oxygen product stream and is delivered to a high pressure (HP) combustor 20, while a second oxygen stream 18 is also split from the main oxygen stream and is delivered to a reheater 22 as described below.

HP combustor 20 is configured to receive first oxygen stream 16 from the ASU as well as a hydrocarbon fuel stream 17. The term "high pressure", as used herein and unless indicated otherwise, refers to an operating pressure of at least about 15 bar (absolute). Similarly, the term "low pressure", as used herein and unless indicated otherwise, refers to an operating pressure of no greater than about 1.5 bar (absolute). The hydrocarbon fuel stream may include any combustible hydrocarbon fuel source including, without limitation, natural gas, syngas and refinery gas. The first oxygen stream and the hydrocarbon fuel stream combine in the high pressure combustor and react to yield primarily steam and carbon dioxide products. Oxygen and hydrocarbon fuel streams 16, 17 are fed to compressors 27, 28 prior to entering combustor 20. Compressors 27, 28 may be driven by electrical power, or, alternatively, system 1 may be configured in any suitable manner to facilitate delivery of mechanical power to compressors 27, 28 via any one or more of gas turbine expander 6 and/or the high and low pressure steam turbines described below. Preferably, the oxygen and hydrocarbon fuel streams entering the HP combustor have an absolute pressure in the range of about 25-150 bar.

A water/steam outlet of heat exchanger 10 is coupled to HP combustor 20 to feed a stream 26 of water and/or steam (i.e., the stream utilized to cool the compressed air) into the HP combustor to be combined with the incoming oxygen and hydrocarbon fuel streams. The flow rate of stream 26 into combustor 20 is controlled to achieve a desired temperature of outlet stream 30 discharged from the combustor. Preferably, the temperature of the combustor outlet stream is in the range of about 400-600° C. The combustor discharge products in outlet stream 30 are primarily steam and carbon dioxide.

Located downstream from the combustor outlet to receive combustor discharge stream 30 is a high pressure (HP) steam turbine 32. Preferably, the stream entering the HP steam turbine has a temperature in the range of about 400-600° C. and an absolute pressure in the range of about 50-150 bar. The HP steam turbine includes a shaft 33 that is driven by the expansion of stream 30 within the HP steam turbine. Shaft 33 of the HP steam turbine is connected to shaft 7 of gas turbine expander 6. Thus, the HP steam turbine is indirectly coupled to the air compressor via the connection with the gas turbine expander. Alternatively, it is noted that the HP steam turbine may be coupled to the air compressor in any other suitable manner to effect transfer of power to the air compressor. The outlet of the HP steam turbine discharges a stream 34 of steam and carbon dioxide to be delivered to reheater 22. Preferably, the HP discharge stream has a pressure in the range of about 10-30 bar.

In addition to receiving discharge stream 34 from the outlet of the HP steam turbine, reheater 22 further receives second split stream 18 of oxygen from the main oxygen product stream (as noted above) as well as a hydrocarbon fuel stream 19. The outlet of the reheater delivers a stream 36 of primarily carbon dioxide and steam to an inlet of gas turbine expander 6 at a selected elevated temperature. It is noted that the outlet pressure of stream 34 being discharged from the HP steam turbine and the outlet temperature of stream 36 being discharged from the reheater are selectively controlled (e.g., by controlling flow rates and/or pressures of the oxygen and hydrocarbon fuel streams delivered to each of the HP steam turbine and reheater, controlling the flow rate of stream 26 including water and/or steam to the HP combustor, etc.) to achieve a desired temperature and pressure range for stream 36 as it enters gas turbine expander 6. Preferably, the inlet stream to the gas turbine expander has an inlet temperature in a range of about 800-1400° C. and an absolute pressure in a range of about 10-30 bar, and the outlet stream emerging from the gas turbine expander preferably has an absolute pressure of about 1 bar.

A low pressure (LP) steam turbine 40 is located downstream of gas turbine expander 6 to receive a discharge stream 38 from the gas turbine expander. The LP steam turbine includes a shaft 41 connected to shaft 33 of HP steam turbine 32. Shaft 41 is driven by expansion of the gas stream flowing through the LP steam turbine. Thus, the LP steam turbine is indirectly coupled to the air compressor via the connection with the HP steam turbine. Alternatively, it is noted that the LP steam turbine may be coupled to the air compressor in any other suitable manner to effect transfer of power to the air compressor.

Optionally, the LP steam turbine may include a further shaft 42 connected to a generator 44 for producing electrical power in addition to the mechanical power utilized to operate air compressor 4. Preferably, the inlet stream to the LP steam turbine has a temperature in a range of about 300-700° C. and an absolute pressure of about 1 bar, and the outlet or discharge stream emerging from the LP steam turbine preferably has an absolute pressure in a range of about 0.05-0.30 bar.

A condenser 48 receives discharge stream 46 from LP steam turbine 40 and utilizes an enclosed stream 47 of cooling water to effect separation of stream 46 into carbon dioxide gas and a condensate including primarily water. Alternatively, it is noted that any other suitable separation device may be employed to substantially separate carbon dioxide from water in the discharge stream from the LP steam turbine. Carbon dioxide gas emerges from the condenser in stream 49 and is delivered as a product to other systems or facilities for storage or utilization in a desired manner, while water stream 24 is recycled to heat exchanger 10 for cooling of the compressed air stream emerging from air compressor 4. A suitable pumping device 50 may be provided in the water stream to effect delivery of water to the heat exchanger at the desired flow rate and pressure. In addition, excess water 31 is removed from water stream 24 at a suitable location between condenser 48 and heat exchanger 10.

In operation, air is drawn into air compressor 4 and pressurized and discharged at a selected pressure (preferably about 5-25 bar (absolute)) to heat exchanger 10. The heat exchanger cools the compressed air to a selected temperature (preferably about 20-50° C.) and discharges stream 11 to ASU 12. At least two product streams 13, 14 of primarily nitrogen and primarily oxygen are discharged from the ASU, and a portion of oxygen stream 14 is split into first and second streams 16 and 18 that are respectively delivered to HP combustor 20 and reheater 22. Water stream 24, which is used to cool compressed air stream 9 in heat exchanger 10, is discharged from the heat exchanger as stream 26 including water and/or steam and delivered to the reheater at a selected flow rate.

First oxygen stream 16 is compressed (preferably to an absolute pressure of about 25-150 bar) and fed to combustor 20, along with compressed hydrocarbon fuel stream 17 and stream 26 of water and/or steam. Discharge stream 30 from the HP combustor, including primarily carbon dioxide and steam, is delivered to HP steam turbine 32 (preferably at a temperature of about 400-600° C. and an absolute pressure of about 50-150 bar) to drive shaft 33, which is connected to gas turbine shaft 7. The discharge stream 34 from the HP steam turbine (preferably at an absolute pressure of about 10-30 bar) is sent to reheater 22, where it is combined with second oxygen stream 18 and hydrocarbon fuel stream 19 to yield a discharge stream 36 of primarily carbon dioxide and steam (preferably at a temperature of about 800-1400° C. and an absolute pressure of about 10-30 bar). Stream 36 enters gas turbine expander 6 and drives gas turbine shaft 7, which is connected to air compressor 4. Discharge stream 38 from the gas turbine expander (preferably at a temperature of about 300-700° C. and an absolute pressure of about 1 bar) is delivered to LP steam turbine 40. The LP steam turbine drives shaft 41, which is connected to shaft 33 of the HP steam turbine and, optionally, shaft 42, which is connected to generator 44. Discharge stream 46 from the LP steam turbine (preferably at an absolute pressure of about 0.05-0.30 bar) is sent to condenser 48 to remove carbon dioxide in stream 49 from the system. Condensate stream 24, including primarily water, emerges from the condenser and is recycled to heat exchanger 10.

It is noted that electrical power may also be generated by withdrawing high pressure nitrogen from a high pressure column of the ASU (indicated as stream 52 in FIG. 1), heating the stream in heat exchanger 10 (preferably to a temperature in the range of about 400-1400° C.), and delivering the heated stream of high pressure nitrogen (indicated as stream 54 in FIG. 1) to a nitrogen turbine 56 to drive an electrical generator 60. As used herein, the term "high pressure nitrogen" refers a nitrogen stream having an absolute pressure of at least about 3 bar. Alternatively, or in addition to driving the electrical generator, the nitrogen turbine may be coupled in a suitable manner to the air compressor to provide further mechanical power directly to the generator. The expanded nitrogen stream (indicated as stream 58 in FIG. 1) may then be delivered as a product to other systems or facilities for storage or use in a desired manner.

The gas turbine expander, HP and LP steam turbines each combine to generate power, via their respective turbine shafts, for directly driving the gas turbine compressor during system operation while eliminating power losses typically associated with converting between mechanical power and electrical power (i.e., converting turbine shaft power to electrical power, followed by electrical power back into mechanical power for driving the air compressor). Thus, system 1 utilizes an optimized gas powered, multiple turbine system for the operation of a zero-emissions process that yields multiple products from both the ASU (e.g., oxygen and nitrogen) and the power generating system (e.g., carbon dioxide). The turbine system further maximizes cycle efficiency and reduces fuel and oxygen costs in comparison to conventional ASU systems.

Figure 2:
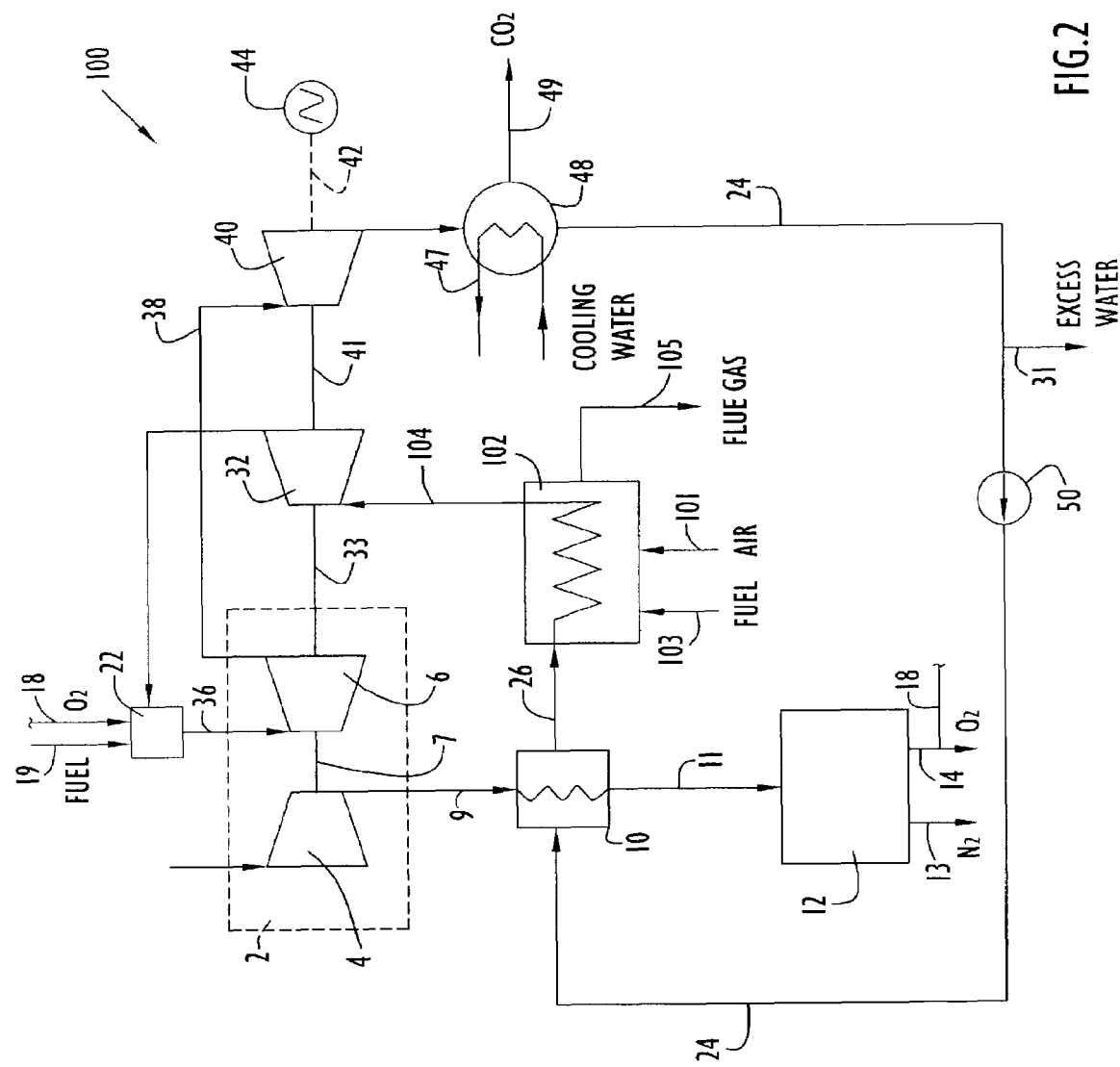
FIG. 2 is a flow diagram of another embodiment of an integrated air separation unit and power generation system in accordance with the present invention.

In an alternative embodiment, the high pressure combustor of the system of FIG. 1 may be replaced by a boiler that generates high pressure steam for delivery to the HP steam turbine. An exemplary embodiment of such a system is illustrated in FIG. 2. Specifically, system 100 is substantially similar to the system described above and depicted in FIG. 1, with the configuration of HP and LP steam turbines with respect to the gas turbine expander being the same. However, system 100 includes a boiler 102 disposed in-line between heat exchanger 10 and HP steam turbine 32, where stream 26 including water and/or steam is discharged from the heat exchanger and delivered to an inlet in the boiler. A stream of hydrocarbon fuel 103 and a stream of air 101 are also delivered to the boiler to heat stream 26 into high pressure steam discharged from the boiler as stream 104. Flue gas exits from the boiler in stream 105. The high pressure steam discharged from the boiler (preferably at a temperature of about 400-600° C. and an absolute pressure of about 50-150 bar) is delivered to HP steam turbine 32, and a stream 106 of steam discharged from the boiler is sent to reheater 22. As is clear from FIG. 2, system 100 otherwise operates in a substantially similar manner as described above for system 1.

The boiler system of FIG. 2 consumes less oxygen than the combustor system of FIG. 1 and further generates less carbon dioxide product, as indicated in the table set forth below. However, due to its reduced efficiency, the boiler system requires a greater amount of hydrocarbon fuel than the combustor system. In addition, unlike the combustor system, the boiler system is not a zero-emissions process. However, assuming the boiler of system 100 has an efficiency of about 90%, the amount of hydrocarbon fuel required per amount of oxygen produced is lower in system 100 in comparison to the system of FIG. 1.

The integrated air separation and oxygen fired power generation system of the present invention reduces power costs in comparison to conventional ASU facilities in which the main air compressor is driven by a motor that receives power either from the facility grid or from an on-site power generation facility (e.g., a cogeneration or combined cycle plant). In addition, the operating temperatures and pressures of the gas turbine expander and steam turbines of each of the systems of FIGS. 1 and 2 are well within the design limits of commercially available devices. Thus, the present invention does not require the use of specially designed, non-conventional components to facilitate system operation.

The benefits of the present invention in comparison to a conventional ASU with on-site power facility are tabulated below based upon a yield of oxygen being 2000 metric tons per day. In particular, the systems of FIGS. 1 and 2 are compared with a conventional ASU facility with an on-line power plant.

| Comparison of Operating Parameters of Integrated ASU Systems with Conventional ASU | | | |
|---|---|---|---|
| Operating Parameters | Conventional ASU | System 1 (FIG. 1) | System 100 (FIG. 2) |
| Oxygen produced (gross) | 2000 mt/day | 2000 mt/day | 2000 mt/day |
| Oxygen consumed | none | 360 mt/day | 244 mt/day |
| Oxygen produced (net) | 2000 mt/day | 1640 mt/day | 1756 mt/day |
| Air compressor power | 31.5 MW | 44.9 MW | 44.9 MW |
| Natural gas consumed | 7793 Nm³/hr | 5763 Nm³/hr | 5969 Nm³/hr |
| Natural gas consumed per ton of oxygen | 93.5 Nm³/mt | 84.3 Nm³/mt | 81.6 Nm³/mt |
| Carbon dioxide produced | none | 247 mt/day | 167 mt/day | mt/day = metric tons per day
Nm³/hr = normal cubic meters per hour
MW = megawatt
Nm³/mt = normal cubic meters per metric ton Calculation of the operating parameters tabulated above was obtained based upon the following additional parameters:

(1) The conventional ASU includes a natural gas fired cycle with 40% net efficiency (8500 Btu/kWh), a compressor discharge pressure of 16 bar (absolute) and four stages of compressor intercooling.

(2) System 1 (FIG. 1) includes a natural gas fired cycle with HP turbine inlet conditions of 550° C. and 150 bar (absolute), gas turbine inlet conditions of 980° C. and 16 bar (absolute), LP turbine outlet conditions of 0.07 bar (absolute), and a compressor discharge pressure of 16 bar (absolute) with no compressor intercooling.

(3) System 100 (FIG. 2) includes a natural gas fired boiler with 90% efficiency and the same turbine and compressor conditions set forth in (2) for System 1.

As indicated in the tabulated operating conditions set forth above, based upon a daily production rate of 2000 metric tons of oxygen, both the systems of FIGS. 1 and 2 consume less natural gas in total as well as per ton of oxygen produced in comparison to a conventional ASU with on-site power plant. In addition, the systems of FIGS. 1 and 2 generate a carbon dioxide product which can be sold to reduce fuel costs during system operation and thus the overall price of the ASU products.

Figure 3:
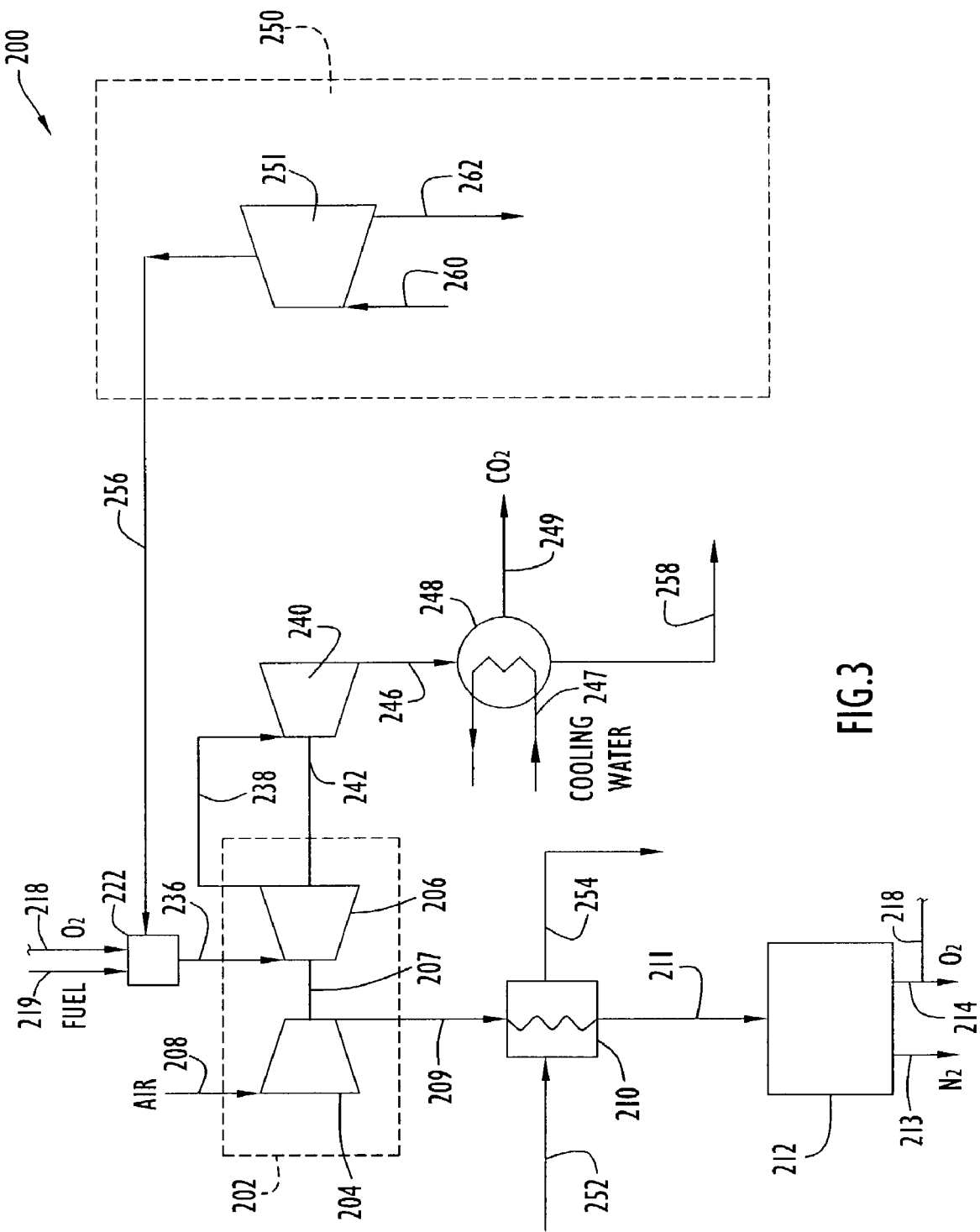
FIG. 3 is a flow diagram of an air separation unit integrated with a power plant in accordance with the present invention.

The integrated air separation and oxygen fired power generation system of the present invention can be further integrated into an existing power generation facility. An exemplary embodiment of such a system is illustrated in FIG. 3, in which the power generation facility includes a Rankine steam cycle with at least one high pressure steam turbine equipped with steam extraction ports. Exemplary power generation facilities in which integration of the air separation unit is made possible include, without limitation, pulverized coal-fired plants, gas-fired combined cycle plants and integrated gasification combined cycle (IGCC) plants. In particular, this system is highly beneficial for power plants requiring ASU products (e.g., IGCC plants, which require large quantities of oxygen for operation).

Referring to FIG. 3, ASU 212 receives compressed air from gas turbine unit 202 in a substantially similar manner as the systems described above and depicted in FIGS. 1 and 2. Gas turbine unit 202 includes an air compressor 204 connected to a gas turbine expander 206 via a shaft 207. An air stream 208 enters the air compressor and is discharged at a desired pressure in stream 209. The compressed air stream 209 is cooled in heat exchanger 210 via a stream 252 of cooling water or boiler feedwater supplied from power plant 250 described below. The water stream used to cool the compressed air stream is discharged from the heat exchanger in stream 254 and is delivered to the boiler or heat recovery steam generator of the power plant (not shown). A discharge stream 211 of the cooled and compressed air enters an inlet of ASU 212, resulting in a separation of air components into a primarily nitrogen stream 213 and a primarily oxygen stream 214 being discharged from the ASU. A portion of main oxygen stream 214 is split into stream 218 and fed to a reheater 222 for providing drive gas to the gas turbine expander as described below.

In the power plant (indicated generally by dashed lines 250), steam is extracted from an exhaust port of high pressure (HP) steam turbine 251 which forms part of the Rankine steam cycle for generating electrical power. For simplicity purposes, only HP steam turbine 251 is depicted in the power plant of FIG. 3. A stream 260 of high pressure steam is delivered from the power plant boiler or high recovery steam generator to the inlet of HP steam turbine 251, and a stream 262 is discharged from the main outlet from the HP steam turbine to the power plant condenser. The HP steam turbine generates power for the plant. In addition, a stream 256 of steam is extracted from at least one extraction port of HP steam turbine 251 and delivered to reheater 222. The location at which the steam is extracted from the HP steam turbine is selected so that the pressure of the steam being sent to the reheater is at the same or similar pressure as the operating pressure of the reheater. A hydrocarbon fuel stream 219 also enters the reheater along with oxygen stream 218 that is split from main oxygen stream 214 discharged from the ASU. The steam is heated in the reheater as a result of the combustion reaction between the hydrocarbon fuel and oxygen, and a stream 236 including primarily carbon dioxide and steam is discharged from the reheater and fed to gas turbine expander 206 at a desired pressure and temperature. The gas turbine expander drives the air compressor, via shaft 207, as a result of stream 236 being provided directly from the reheater. A discharge stream 238 from expander 206 is delivered to a low pressure (LP) steam turbine 240, which drives a shaft 242 that is connected to shaft 207 of the expander.

The LP steam turbine discharges a stream 246 including the steam and carbon dioxide to a condenser 248. The condenser utilizes a supply of cooling water 247 to effect a separation of water from carbon dioxide. The carbon dioxide emerges from the condenser in stream 249 and is delivered as a product to other systems or facilities for storage or utilization in a desired manner. The condensate, including primarily water, emerges from the condenser in stream 258 and is returned to a cooling system of the power plant.

Thus, system 200 utilizes steam extracted from the power plant steam turbine to generate a portion of the power required to operate the ASU, while a portion of the oxygen product generated by the ASU is also utilized to generate power for the ASU. In addition, heat energy is recovered for use in the power plant by directing water utilized to cool the compressed air in the heat exchanger to the power plant boiler or heat recovery steam generator. Although not shown, system 200 may also generate electrical power by integrating one or more generators into the system in a substantially similar manner as the previously described systems of FIGS. 1 and 2. As is the case with the previous systems, system 200 further requires less energy to produce ASU products in comparison to conventional ASU systems such as those described above.

Having described novel integrated air separation and oxygen fired power generation systems and corresponding methods, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. An integrated air separation and power generation system comprising:
   a gas turbine unit including an air compressor, a gas turbine expander coupled to the air compressor and a combustion unit located upstream from the expander to feed drive gas to the expander;
   an air separation unit to receive compressed air from the air compressor and produce at least two product streams including a stream of primarily oxygen, a portion of the oxygen stream produced by the air separation unit being fed to the combustion unit;
   a second turbine coupled to the air compressor and located downstream from the expander to receive drive gas discharged from the expander;
   wherein each of the expander and the second turbine drive the air compressor when drive gas flows through the expander and the second turbine;
   a third turbine coupled to the air compressor to drive the air compressor when drive gas flows through the third turbine;
   wherein the combustion unit is located downstream from the third turbine to receive drive gas discharged from the third turbine; and
   a second combustion unit disposed directly upstream from the third turbine to feed drive gas to the third turbine.

2. The system of claim 1, further comprising:
   a heat exchanger located downstream from the air compressor and upstream from the air separation unit to receive and cool compressed air from the air compressor prior to delivery of the compressed air to the air separation unit;
   wherein a cooling stream including water is input to the heat exchanger to cool the compressed air, and a discharge stream including at least one of water and steam is fed from the heat exchanger to the second combustion unit;

wherein the second combustion unit provides combustion products including carbon dioxide and steam to the third turbine.

3. The system of claim 2, wherein a second portion of the oxygen stream produced by the air separation unit is fed to the second combustion unit.

4. The system of claim 2, wherein the flow rate of the discharge stream delivered from the heat exchanger to the second combustion unit is controllable to achieve a selected gas feed temperature at an inlet of the third turbine.

5. The system of claim 1, further comprising:
a heat exchanger located downstream from the air compressor and upstream from the air separation unit to receive and cool compressed air from the air compressor prior to delivery of the compressed air to the air separation unit;
wherein a cooling stream including water is input to the heat exchanger to cool the compressed air, and a discharge stream including at least one of water and steam is fed from the heat exchanger to the second combustion unit;
wherein the second combustion unit comprises a boiler that receives the discharge stream delivered from the heat exchanger and heats the discharge stream to provide a feed gas stream including steam to an inlet of the third turbine at a selected temperature and pressure.

6. The system of claim 1, further comprising:
a heat exchanger located downstream from the air compressor and upstream from the air separation unit to receive and cool compressed air from the air compressor prior to delivery of the compressed air to the air separation unit;
wherein a cooling stream including water is input to the heat exchanger to cool the compressed air, and a discharge stream including at least one of water and steam is fed from the heat exchanger to the second combustion unit;
wherein the cooling stream input to the heat exchanger is obtained by recycling of a discharge stream from the second turbine.

7. The system of claim 6, wherein the discharge stream from the second turbine includes steam and carbon dioxide, and the system further comprises:
a condenser located downstream from the second turbine and upstream from the heat exchanger, wherein the separator receives the discharge stream from the second turbine and separates the discharge stream into a product stream including carbon dioxide and the cooling stream to be fed to the heat exchanger.

8. An integrated air separation and power generation system comprising:
a gas turbine unit including an air compressor, a gas turbine expander coupled to the air compressor and a combustion unit located upstream from the expander to feed drive gas to the expander;
an air separation unit to receive compressed air from the air compressor and produce at least two product streams including a stream of primarily oxygen, a portion of the oxygen stream produced by the air separation unit being fed to the combustion unit;
a second turbine coupled to the air compressor and located downstream from the expander to receive drive gas discharged from the expander;
wherein each of the expander and the second turbine drive the air compressor when drive gas flows through the expander and the second turbine; and
a third turbine coupled to the air compressor to drive the air compressor when drive gas flows through the third turbine;
wherein the combustion unit is located downstream from the third turbine to receive drive gas discharged from the third turbine;
wherein the operating pressure of the second turbine is no greater than about 1.5 bar (absolute), and the operating pressure of the third turbine is at least about 15 bar (absolute).

9. An integrated air separation and power generation system comprising:
a gas turbine unit including an air compressor, a gas turbine expander coupled to the air compressor and a combustion unit located upstream from the expander to feed drive gas to the expander;
an air separation unit to receive compressed air from the air compressor and produce at least two product streams including a stream of primarily oxygen, a portion of the oxygen stream produced by the air separation unit being fed to the combustion unit;
a second turbine coupled to the air compressor and located downstream from the expander to receive drive gas discharged from the expander;
wherein each of the expander and the second turbine drive the air compressor when drive gas flows through the expander and the second turbine; and
a third turbine coupled to the air compressor to drive the air compressor when drive gas flows through the third turbine;
wherein the combustion unit is located downstream from the third turbine to receive drive gas discharged from the third turbine;
wherein system operating conditions are controllable such that an inlet temperature of the third turbine is about 400-600° C., an inlet pressure of the third turbine is about 50-150 bar (absolute), and an outlet pressure of the third turbine is about 10-30 bar (absolute).

10. An integrated air separation and power generation system comprising:
a gas turbine unit including an air compressor, a gas turbine expander coupled to the air compressor and a combustion unit located upstream from the expander to feed drive gas to the expander;
an air separation unit to receive compressed air from the air compressor and produce at least two product streams including a stream of primarily oxygen, a portion of the oxygen stream produced by the air separation unit being fed to the combustion unit;
a second turbine coupled to the air compressor and located downstream from the expander to receive drive gas discharged from the expander;
wherein each of the expander and the second turbine drive the air compressor when drive gas flows through the expander and the second turbine; and
a third turbine coupled to the air compressor to drive the air compressor when drive gas flows through the third turbine;
wherein the combustion unit is located downstream from the third turbine to receive drive gas discharged from the third turbine;
wherein system operating conditions are controllable such that an inlet temperature of the expander is about 800-1400° C., an inlet pressure of the expander is about 10-30 bar (absolute), and an outlet pressure of the expander is about 1 bar (absolute).

11. An integrated air separation and power generation system comprising:
a gas turbine unit including an air compressor, a gas turbine expander coupled to the air compressor and a combustion unit located upstream from the expander to feed drive gas to the expander;
an air separation unit to receive compressed air from the air compressor and produce at least two product streams including a stream of primarily oxygen, a portion of the oxygen stream produced by the air separation unit being fed to the combustion unit;
a second turbine coupled to the air compressor and located downstream from the expander to receive drive gas discharged from the expander;
wherein each of the expander and the second turbine drive the air compressor when drive gas flows through the expander and the second turbine; and
a third turbine coupled to the air compressor to drive the air compressor when drive gas flows through the third turbine;
wherein the combustion unit is located downstream from the third turbine to receive drive gas discharged from the third turbine;
wherein system operating conditions are controllable such that an inlet temperature of the second turbine is about 300-700° C., an inlet pressure of the second turbine is about 1 bar (absolute), and an outlet pressure of the second turbine is about 0.05-0.30 bar (absolute).

12. An integrated air separation and power generation system comprising:
a gas turbine unit including an air compressor, a gas turbine expander coupled to the air compressor and a combustion unit located upstream from the expander to feed drive gas to the expander;
an air separation unit to receive compressed air from the air compressor and produce at least two product streams including a stream of primarily oxygen, a portion of the oxygen stream produced by the air separation unit being fed to the combustion unit;
a second turbine coupled to the air compressor and located downstream from the expander to receive drive gas discharged from the expander;
wherein each of the expander and the second turbine drive the air compressor when drive gas flows through the expander and the second turbine; and
a third turbine coupled to the air compressor to drive the air compressor when drive gas flows through the third turbine;
wherein the combustion unit is located downstream from the third turbine to receive drive gas discharged from the third turbine;
wherein the air separation unit further produces a high pressure stream of primarily nitrogen, and the system further comprises;
a heat exchanger to elevate the temperature of the high pressure nitrogen stream to a temperature in the range of about 400-1400° C.;
a nitrogen turbine positioned to receive at least a portion of the heated high pressure nitrogen stream discharged from the heat exchanger;
wherein the nitrogen turbine drives at least one of the air compressor and an electrical generator coupled to the nitrogen turbine when the high pressure nitrogen stream flows through the nitrogen turbine.

13. A method of providing power to an air separation unit via an integrated power generation system including a first turbine, a second turbine, an air compressor, and a combustion unit, wherein the first and second turbines are coupled to the air compressor, the method comprising:
reacting oxygen with a hydrocarbon fuel in the combustion unit to produce a drive gas for the first turbine;
driving the air compressor by feeding the drive gas from the combustion unit directly through the first turbine and subsequently through the second turbine;
generating a compressed air stream by the air compressor as a result of the air compressor being driven by the first and second turbines;
feeding the compressed air stream from the air compressor to the air separation unit;
processing the compressed air stream in the air separation unit to yield at least two product streams including a stream of primarily oxygen; and
feeding a portion of the oxygen stream produced by the air separation unit to the combustion unit;
wherein the system further includes a third turbine coupled to the air compressor to further drive the air compressor when drive gas is fed through the third turbine, and the method further comprises:
feeding drive gas discharged from the third turbine to the combustion unit;
wherein the system further includes a second combustion unit, and the method further comprises:
producing a drive gas for the third turbine in the second combustion unit; and
feeding drive gas from the second combustion unit to the third turbine.

14. The method of claim 13, wherein the system further comprises a heat exchanger located downstream from the air compressor and upstream from the air separation unit, and the method further comprises:
feeding compressed air from the air compressor to the heat exchanger;
cooling the compressed air fed to the heat exchanger with a cooling stream including water;
feeding the compressed air discharged from the heat exchanger to the air separation unit; and
feeding the cooling stream discharged from the heat exchanger to the second combustion unit, wherein the cooling stream discharged from the air compressor unit includes at least one of water and steam.

15. The method of claim 14, wherein the drive gas fed to the third turbine includes steam and carbon dioxide, and the method further comprises:
feeding a second portion of the oxygen stream produced by the air separation unit to the second combustion unit.

16. The method of claim 15, further comprising:
controlling the flow rate of the cooling stream discharged from the heat exchanger to the second combustion unit to achieve a selected temperature of the drive gas fed to the third turbine.

17. The method of claim 14, wherein the second combustion unit comprises a boiler, and the method further comprises:
heating the cooling stream discharged from the heat exchanger in the boiler to produce steam at a selected temperature and pressure to be fed as the drive gas to the third turbine.

18. The method of claim 14, wherein the system further includes a condenser located directly downstream from the second turbine, the discharge gas from the second turbine includes steam and carbon dioxide, and the method further comprises:
- feeding the discharge gas from the second turbine to the condenser; and
- separating the discharge gas into a product stream including carbon dioxide and the cooling stream to be recycled to the heat exchanger.

19. A method of providing power to an air separation unit via an integrated power generation system including a first turbine, a second turbine, an air compressor, and a combustion unit, wherein the first and second turbines are coupled to the air compressor, the method comprising:
- reacting oxygen with a hydrocarbon fuel in the combustion unit to produce a drive gas for the first turbine;
- driving the air compressor by feeding the drive gas from the combustion unit directly through the first turbine and subsequently through the second turbine;
- generating a compressed air stream by the air compressor as a result of the air compressor being driven by the first and second turbines;
- feeding the compressed air stream from the air compressor to the air separation unit;
- processing the compressed air stream in the air separation unit to yield at least two product streams including a stream of primarily oxygen; and
- feeding a portion of the oxygen stream produced by the air separation unit to the combustion unit;
- wherein the system further includes a third turbine coupled to the air compressor to further drive the air compressor when drive gas is fed through the third turbine, and the method further comprises:
- feeding drive gas discharged from the third turbine to the combustion unit;
- wherein the operating pressure of the second turbine is no greater than about 1.5 bar (absolute), and the operating pressure of the third turbine is at least about 15 bar (absolute).

20. A method of providing power to an air separation unit via an integrated power generation system including a first turbine, a second turbine, an air compressor, and a combustion unit, wherein the first and second turbines are coupled to the air compressor, the method comprising:
- reacting oxygen with a hydrocarbon fuel in the combustion unit to produce a drive gas for the first turbine;
- driving the air compressor by feeding the drive gas from the combustion unit directly through the first turbine and subsequently through the second turbine;
- generating a compressed air stream by the air compressor as a result of the air compressor being driven by the first and second turbines;
- feeding the compressed air stream from the air compressor to the air separation unit;
- processing the compressed air stream in the air separation unit to yield at least two product streams including a stream of primarily oxygen; and
- feeding a portion of the oxygen stream produced by the air separation unit to the combustion unit;
- wherein the system further includes a third turbine coupled to the air compressor to further drive the air compressor when drive gas is fed through the third turbine, and the method further comprises:
- feeding drive gas discharged from the third turbine to the combustion unit;
- further comprising:
- controlling the system operating conditions to provide an inlet temperature of the third turbine of about 400-600° C., an inlet pressure of the third turbine of about 50-150 bar (absolute), and an outlet pressure of the third turbine of about 10-30 bar (absolute).

21. A method of providing power to an air separation unit via an integrated power generation system including a first turbine, a second turbine, an air compressor, and a combustion unit, wherein the first and second turbines are coupled to the air compressor, the method comprising:
- reacting oxygen with a hydrocarbon fuel in the combustion unit to produce a drive gas for the first turbine;
- driving the air compressor by feeding the drive gas from the combustion unit directly through the first turbine and subsequently through the second turbine;
- generating a compressed air stream by the air compressor as a result of the air compressor being driven by the first and second turbines;
- feeding the compressed air stream from the air compressor to the air separation unit;
- processing the compressed air stream in the air separation unit to yield at least two product streams including a stream of primarily oxygen; and
- feeding a portion of the oxygen stream produced by the air separation unit to the combustion unit;
- wherein the system further includes a third turbine coupled to the air compressor to further drive the air compressor when drive gas is fed through the third turbine, and the method further comprises:
- feeding drive gas discharged from the third turbine to the combustion unit;
- further comprising:
- controlling the system operating conditions to provide an inlet temperature of the first turbine of about 800-1400° C., an inlet pressure of the first turbine of about 10-30 bar (absolute), and an outlet pressure of the first turbine of about 1 bar (absolute).

22. A method of providing power to an air separation unit via an integrated power generation system including a first turbine, a second turbine, an air compressor, and a combustion unit, wherein the first and second turbines are coupled to the air compressor, the method comprising:
- reacting oxygen with a hydrocarbon fuel in the combustion unit to produce a drive gas for the first turbine;
- driving the air compressor by feeding the drive gas from the combustion unit directly through the first turbine and subsequently through the second turbine;
- generating a compressed air stream by the air compressor as a result of the air compressor being driven by the first and second turbines;
- feeding the compressed air stream from the air compressor to the air separation unit;
- processing the compressed air stream in the air separation unit to yield at least two product streams including a stream of primarily oxygen; and
- feeding a portion of the oxygen stream produced by the air separation unit to the combustion unit;
- wherein the system further includes a third turbine coupled to the air compressor to further drive the air compressor when drive gas is fed through the third turbine, and the method further comprises:
- feeding drive gas discharged from the third turbine to the combustion unit;
- further comprising:
- controlling the system operating conditions to provide an inlet temperature of the second turbine of about 300-700° C., an inlet pressure of the second turbine of about 1 bar (absolute), and an outlet pressure of the second turbine of about 0.05-0.30 bar (absolute).

23. A method of providing power to an air separation unit via an integrated power generation system including a first turbine, a second turbine, an air compressor, and a combustion unit, wherein the first and second turbines are coupled to the air compressor, the method comprising:

reacting oxygen with a hydrocarbon fuel in the combustion unit to produce a drive gas for the first turbine;

driving the air compressor by feeding the drive gas from the combustion unit directly through the first turbine and subsequently through the second turbine;

generating a compressed air stream by the air compressor as a result of the air compressor being driven by the first and second turbines;

feeding the compressed air stream from the air compressor to the air separation unit;

processing the compressed air stream in the air separation unit to yield at least two product streams including a stream of primarily oxygen; and feeding a portion of the oxygen stream produced by the air separation unit to the combustion unit;

wherein the system further includes a third turbine coupled to the air compressor to further drive the air compressor when drive gas is fed through the third turbine, and the method further comprises:

feeding drive gas discharged from the third turbine to the combustion unit;

further comprising:

producing a high pressure stream of primarily nitrogen from the air separation unit;

feeding the high pressure stream of primarily nitrogen through a heat exchanger to heat the high pressure stream of primarily nitrogen; and feeding the heated, high pressure stream of primarily nitrogen through a nitrogen turbine to drive at least one of the air compressor and an electrical generator coupled to the nitrogen turbine to produce electrical energy.

* * * * *